United States Patent [19]

Hishida

[11] Patent Number: 4,925,322
[45] Date of Patent: May 15, 1990

[54] BALL BEARING
[75] Inventor: Tadashi Hishida, Sakai, Japan
[73] Assignee: VIV Engineering Inc., Osaka, Japan
[21] Appl. No.: 318,712
[22] Filed: Mar. 3, 1989
[30] Foreign Application Priority Data
  Mar. 3, 1988 [JP] Japan .................................. 63-29631
  Aug. 23, 1988 [JP] Japan ............................... 63-110834
[51] Int. Cl.⁵ ........................................... F16C 33/64
[52] U.S. Cl. .................... 384/486; 384/505;
                              384/510; 384/512; 384/537
[58] Field of Search ............... 384/486, 505, 512, 510,
                                    384/545, 547, 484, 537

[56]         References Cited
         U.S. PATENT DOCUMENTS 609,835  8/1898  Roberts ............................ 384/545
1,337,882  4/1920  Bott .................................. 384/510
2,499,837  3/1950  Sheets et al. ..................... 384/547
2,510,659  6/1950  Ristow .............................. 384/512

Primary Examiner—Lenard A. Footland
Attorney, Agent, or Firm—Wenderoth, Lind & Ponack

[57]         ABSTRACT

A ball bearing having an inner ring, a pair of outer rings, balls interposed therebetween, and a retainer for keeping the balls spaced apart from one another. The outer rings each have a straight portion and an arcuate portion integral with the straight portion. The outer rings have their opposite end faces butting together. The arcuate portion has such a curvature as to conform to the contour of the balls. To the arcuate portion of each outer ring is attached a seal member made of a resilient material and integrally formed over its entire peripheral length with lip portions kept in sealing contact with the inner ring.

4 Claims, 1 Drawing Sheet

BALL BEARING

BACKGROUND OF THE INVENTION

The present invention relates to a ball bearing.

A prior art ball bearing such as a radial ball bearing has an inner ring formed in its outer periphery with a ball guide groove, an outer ring formed in its inner periphery with a ball guide groove, a plurality of balls received in the guide grooves formed in the inner and outer rings, and a retainer for keeping the balls circumferentially apart from one another.

It is comparatively easy to grind a ball guide groove in the outer periphery of the inner ring of such a prior art ball bearing by use of a grinder, because the diameter of the grinder is not limited. But it is extremely difficult to precisely grind a ball guide groove in the inner periphery of the outer ring especially if the bearing is a small-sized one. This is because in order to grind such a groove the grinder has to have a smaller diameter than the inner diameter of the outer ring. Another disadvantage is that such a small-diameter grinder with a short peripheral length tends to wear rapidly.

To assemble such a ball bearing, the outer ring is moved to an offset position with respect to the inner ring to create a wide gap between the rings at one side, the balls are set in the gap, the outer ring is brought back into alignment with the inner ring, and finally the retainer is mounted to hold the balls spaced apart from one another. Such complicated assembling steps increase the production cost.

SUMMARY OF THE INVENTION

It is an object of the present invention to provide a ball bearing which obviates the abovesaid shortcomings, which eliminates the necessity of grinding its outer ring, and which permits easy insertion of the balls.

According to the present invention, the outer ring can be formed easily by pressing. To assemble the bearing, the balls supported by the retainer are set in the ball guide grooves formed in the inner ring and the pair of outer rings are mounted from both sides. Thus, the balls can be mounted extremely easily compared with conventional ball bearings.

Other features and objects of the present invention will become apparent from the following description taken with reference to the accompanying drawings, in which:

DETAILED DESCRIPTION OF THE PREFERRED EMBODIMENT

Figure 1:
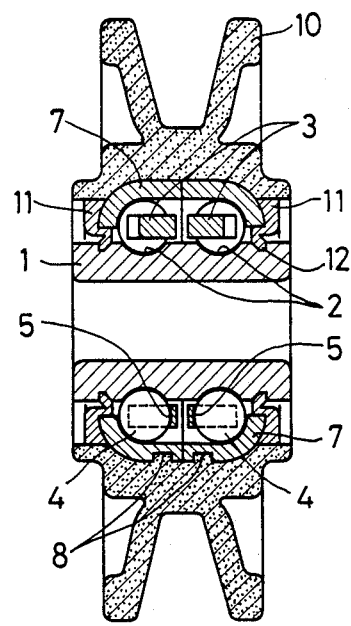
FIG. 1 is a vertical sectional side view of the first embodiment.

An inner ring 1 is made by cutting a steel pipe to a predetermined length and grinding its ends and outer and inner surfaces with a lathe or the like. Two rows of ball guide grooves 2 are formed in its outer periphery by use of a grinder.

A pair of annular retainers 3 of plastic are formed in one side thereof with a plurality of recesses 5 at equal angular intervals.

Balls 4 are received in the respective recesses 5 of the retainers 3 and engaged in the guide grooves 2 of the inner ring 1.

A pair of outer rings 7 are made by punching a metallic plate such as a steel plate with a press.

Figure 2:
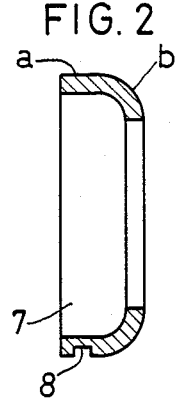
FIG. 2 is an enlarged vertical sectional side view of one of the outer rings of the same.

As shown in FIG. 2, the outer rings 7 have a straight portion a and an arcuate portion b having a substantially quarter circular section. The arcuate portion b has its inner periphery curved so as to conform to the contour of the balls 4.

The straight portion a of each outer ring 7 is formed in its outer periphery with an eccentric groove 8.

Numeral 10 designates a resin molding formed around the outer rings 7 after butting together the ends of the straight portions a of the outer rings 7.

The resin molding 10 is in the shape of a V pulley in the preferred embodiment, but it may be in the shape of a pulley for a flat belt, a gear or a rolling wheel for a crawler. In the preferred embodiment, the molding 10 and thus the outer rings 7 are adapted to be rotated around the shaft mounted in the inner ring 1. But the molding 10 may be formed to serve as a bearing to allow a shaft to rotate in the inner ring 1.

Each outer ring 7 has an annular seal member 11 made of a resilient material such as rubber snapped on the outer periphery of its arcuate portion b. Each seal member 11 is formed along its inner edge with a lip 12 kept in contact with the outer periphery of the inner ring 1.

The inner ring 1 is formed in its outer periphery with annular grooves to receive the lip portions 12 in the preferred embodiment, but may not be formed with annular grooves.

Figure 3:
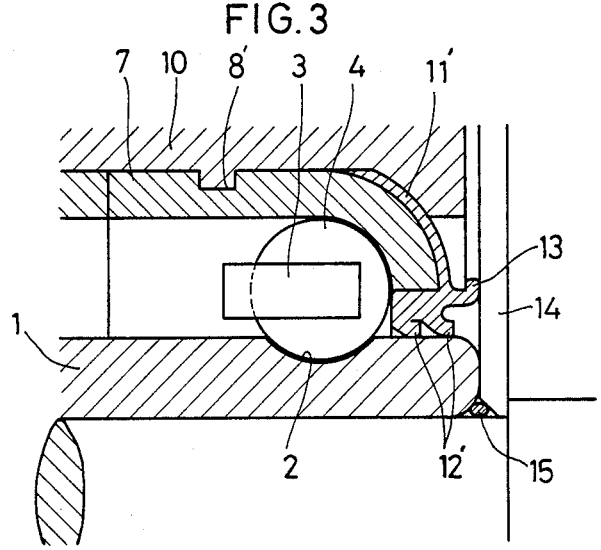
FIG. 3 is an enlarged sectional view of the second embodiment.

FIG. 3 shows the second embodiment which differs from the first embodiment only in a seal member 11'. It is made of a soft and resilient material such as rubber attached as by baking to the outer periphery of the curved portion b of the outer ring 7. The seal member 11' is integrally formed on its inner edge with two lips 12' elastically kept in contact with the outer periphery of the inner ring 1.

The second embodiment is also provided with a cover 14 abutting the outer end of the inner ring 1 to keep off mud or other foreign matter. The seal member 11' is formed with a third lip 13 kept in sealing contact with the inner surface of the cover 14. Numeral 15 designates an 0-ring mounted between the cover 14 and the outer end of the inner ring 1 to keep off water, etc.

In this embodiment, the outer ring 7 is formed in its outer periphery with an annular groove 8' to receive the resin in forming the molding 10 to make the outer ring 7 integral with the molding 10.

The construction of the ball bearing according to the present invention makes it easy to form a seal member around the outer ring 7.

What is claimed is:

1. A ball bearing comprising:
   an inner ring having formed in the outer periphery thereof two ball guide grooves;
   a plurality of balls in said ball guide grooves;
   retainer means holding said balls in position in said guide grooves;
   a pair of outer rings fitted over said inner ring to cover the respective rows of balls, said outer rings having adjacent inner edges butted together and each having a cross-sectional shape with a straight portion extending from said inner edge and an arcuate portion adjacent the edge on the opposite side of the ring from said inner edge, said cross-sectional shape substantially conforming to the contour of said balls, each outer ring having in the outer periphery thereof an eccentric groove; and a resin molding around said outer rings with part of said resin molding engaging in said eccentric grooves so that said molding is integral with said outer rings.

2. A ball bearing as claimed in claim 1, further comprising seal means made of an elastic material and mounted on said outer rings at the arcuate portions, said seal means being integrally formed over the entire peripheral length thereof with a first lip portion kept in sealing contact with the outer periphery of said inner ring.

3. A ball bearing as claimed in claim 2, further comprising covering means fixedly mounted on said inner ring at both ends thereof, said seal means being integrally formed over the entire peripheral length thereof with a second lip portion kept in sealing contact with said covering means.

4. A ball bearing as claimed in claim 2, wherein said seal means are mounted on said arcuate portions by baking.

* * * * *